May 27, 1941.    D. H. CLEWELL    2,243,746
GRAVITY METER
Filed Feb. 21, 1940
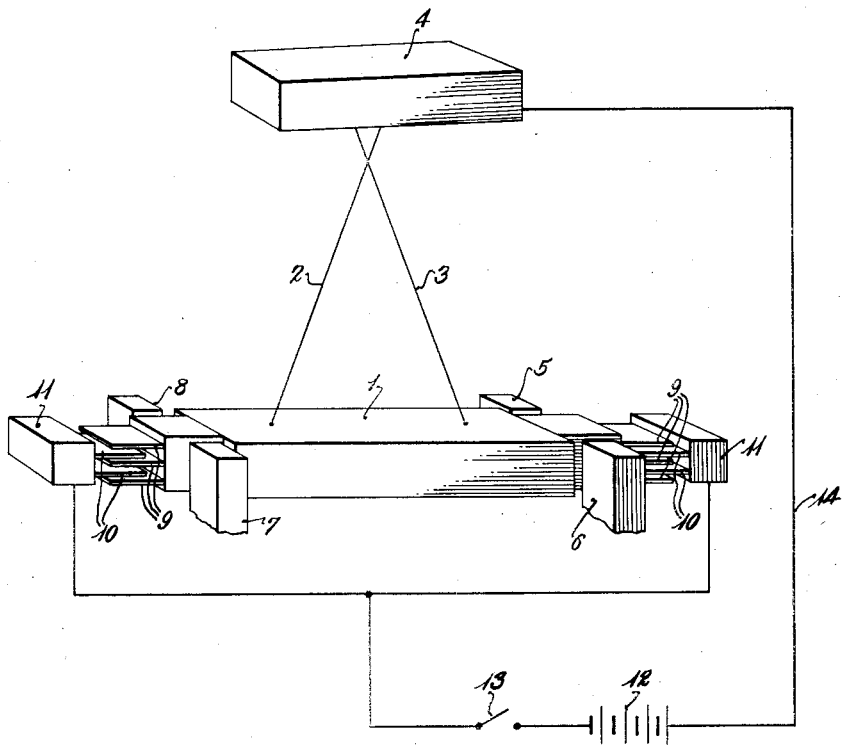
Inventor
Dayton H. Clewell
By Dallas R. Lamont
Attorney Patented May 27, 1941

2,243,746

UNITED STATES PATENT OFFICE 2,243,746

GRAVITY METER

Dayton H. Clewell, Dallas, Tex., assignor, by mesne assignments, to Socony-Vacuum Oil Company, Incorporated, New York, N. Y., a corporation of New York Application February 21, 1940, Serial No. 320,052

1 Claim. (Cl. 265—1.4)

This invention relates to an improvement in gravity meters and more particularly to an improvement in that type of gravity meters in which a mass is resiliently supported during the taking of measurements and is clamped rigidly in position at other times so that the shock incident to moving it about will not injure it or change its calibration. In particular, the present invention is directed to providing in such a gravity meter a means to prevent or stop the oscillations that would normally be occasioned by the release of the clamping means or by outside disturbances.

It is well known that gravity meters are extremely sensitive instruments which must be protected against shocks or disturbances of any kind but it is nevertheless necessary to move these instruments from place to place if they are to be used in geophysical exploration, in order that measurements be made at these places. In order that this could be done without injuring the delicate mechanism or destroying the calibration of the instrument it has been common to provide the instrument with clamps that clamp the mass in position during transportation and until the time comes to take a measurement. At that time the clamps are released and the mass allowed to come to rest at a position of balance indicative of the relative gravitational force being exerted at that particular location. However, the process of coming to rest almost invariably takes a very considerable period of time and often places undesirable strains on the instrument which stretch the supporting wires or in other ways affect its calibration.

The reason for this is that regardless of how carefully the clamps are made that clamp the mass in position it is almost impossible to release the mass from them without imparting to the mass an impetus that starts it swinging on its resilient support. Being in delicate balance, unless there are damping means provided, the swinging continues for a long period of time. Several types of damping means have been suggested but are generally unsatisfactory because they not only damp the oscillations of the mass but they so restrict its movement as to greatly reduce the accuracy of the measurements.

According to the present invention a new type of damping or centering means is provided which quickly and simply brings the mass to its zero or base position and eliminates all tendency of the mass to oscillate and yet does this without interfering in any way with the ultimate sensitivity of the device.

This is accomplished by means of a device which consists of a set of condenser plates attached to at least one end of the mass of the gravity meter and a set of corresponding condenser plates attached to a stationary support and in such relation to the first set of condenser plates that the two sets of condenser plates are quite close together when the mass is in its normal or base position and are moved apart or out of register when the mass moves from its base position. A potential is applied between these two sets of condenser plates through a manually operated switch so that when the mass is being unclamped or after it has been unclamped and is in oscillation, or after it has been set in oscillation by some outside disturbance, the potential can be applied between the two sets of plates and the force of attraction between the plates which results brings the mass back to its base or zero position. Preferably there are several plates in each set and two sets of condenser plates are fixed to the mass, one set at each end, with corresponding stationary plates also at each end of the mass. By this construction sufficient force may be applied to bring the mass quickly to its zero or base position and yet the force is applied symmetrically so that there is no tendency to introduce an unsymmetrical oscillation of the mass that will persist despite the force exerted by the centering means. Generally the potential between the fixed plates and the plates attached to the mass will be applied by means of a battery or other source of direct current through a simple push button switch, but alternating current may be used and of course other types of manual switches or even automatically operated switches which operate automatically when the device is unclamped, may be provided.

In some of the newer gravity meters arrangements are being made so that all readings are taken with the mass at a fixed or base position, the difference in gravitational force being compensated by bringing an additional force to bear on the mass to hold it in the base position. This may be done electromagnetically or electrostatically or by other means which do not form a part of this invention and will not be discussed here. However, when such is the case, the present invention has a particular application in that the mass can be immediately centered and an amount of force applied which is estimated as being sufficient to hold the mass in its centered position. The centering mechanism is then released and an observation made as to whether or not the mass does remain in the centered position. If it does not, further adjustment in the force applied to the mass can be made and the mass again centered and another observation made upon releasing the centering mechanism. Thus accurate determinations can rapidly be made without the necessity of waiting each time until the mass comes to rest of its own volition.

Further understanding of the principles of this invention and its specific advantages may be obtained by a consideration of the accompanying drawing and the following detailed description thereof. In this drawing only the essential parts of the preferred form of the device are shown in order to simplify the explanation. However, many modifications of the exact structure of the device may be made all within the scope of this invention as will readily be understood by those skilled in the art.

In the drawing, the sole figure is a prospective view of a part of a gravity meter embodying the principles of this device.

As shown in the drawing a mass 1 is supported by torsional elements 2 and 3 from a support 4 and held in place when not in use by clamping members 5, 6, 7, and 8. An optical system not shown may be arranged in any suitable relation to the mass so that its position can be accurately determined at any time. On each end of the mass 1 is a series of condenser plates 9 which extend outwardly from the mass between condenser plates 10 supported on any suitable type of fixed or permanent supports 11. The fixed plates are of the same width as the movable plates. While these supports are considered fixed it is to be understood that they may be mounted so that they can be adjusted from time to time to place them in any desired relation to the mass and thus fix the position to which they tend to bring the mass when the potential is applied between them and the condenser plates on the mass.

A battery 12 is connected through a switch 13 to the two fixed supports 11 on one end and through a lead 14 to the support for the mass and through it to the mass and the condenser plates 9 on the other end. Thus, when the switch 13 is closed a potential is applied across the plate of the two condensers at opposite ends of the mass 1 and the attraction between these plates immediately tends to bring the mass to its base or zero position.

In operation, before the clamping members 5, 6, 7 and 8 are actuated to release the mass, the switch 13 may be closed. Thereafter as the clamping members release the mass the attraction between the condenser plates holds the mass at exactly centered position. After the clamping members have been entirely removed from contact with the mass, the switch 13 may be opened and the mass allowed to swing free without any tendency to oscillate having been imparted to it.

Alternatively, the clamping members 5, 6, 7 and 8 may be released prior to the closing of the switch 13 in which case the oscillations start when the clamping members are released but are immediately stopped by the closing of the switch 13 and the attraction between the condenser plates caused thereby. Preferably, however, the switch 13 will be closed first thus preventing the oscillation which might do some damage to the instrument or its calibration before it could be stopped.

While the preferred embodiment as shown by the drawing includes condensers at each end of the mass 1, very satisfactory effects may be obtained by a condenser only at one end of the mass and the condenser or condensers may consist of either a larger or smaller number of plates than the number shown in the drawing. Numerous other changes will be immediately apparent to those skilled in the art and it is to be understood that the embodiment shown is only one possible embodiment which has been found particularly advantageous and that many other embodiments may be made all within the scope of the appended claim.

I claim:

In a gravity meter in which a mass is resiliently suspended from a support during the measuring process and clamped into position between measurements, the improvement that comprises means to stop any oscillation of the mass caused by its release from the clamps or by other disturbances, including a plurality of parallel electro-conductive plates fixed to the mass, a plurality of stationary electro-conductive plates positioned in parallel relationship to and intermeshing with said first series of plates when the mass is in its normal or base position, means to impress an electrical potential difference upon said members and means to connect and disconnect said potential difference whereby the conductive members will attract one toward the other during the application of the potential difference and tend to fix the position of the mass.

DAYTON H. CLEWELL.